(12) United States Patent
Mikajiri

(10) Patent No.: US 7,817,313 B2
(45) Date of Patent: Oct. 19, 2010

(54) IMAGE SCANNER, IMAGE FORMING APPARATUS, AND IMAGE SCANNING METHOD

(75) Inventor: Susumu Mikajiri, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 277 days.

(21) Appl. No.: 11/979,433

(22) Filed: Nov. 2, 2007

(65) Prior Publication Data

US 2008/0112020 A1 May 15, 2008

(30) Foreign Application Priority Data

Nov. 15, 2006 (JP) ............................. 2006-309701

(51) Int. Cl.
*H04N 1/04* (2006.01)
(52) U.S. Cl. .................. 358/497; 358/474; 358/494
(58) Field of Classification Search ................ 358/497, 358/494, 474, 505, 401, 501; 174/117 FF; 399/212
See application file for complete search history.

(56) References Cited

U.S. PATENT DOCUMENTS

| 6,196,855 B1 * | 3/2001 | Huang ........................ 439/162 |
| 6,576,840 B1 * | 6/2003 | Huang et al. .................. 174/69 |
| 6,731,896 B2 * | 5/2004 | Kohchi ........................ 399/211 |
| 6,953,898 B2 * | 10/2005 | Chen et al. ................. 174/99 R |
| 6,975,436 B2 * | 12/2005 | Saito .......................... 358/497 |
| 7,116,451 B2 * | 10/2006 | Chang ........................ 358/497 |

FOREIGN PATENT DOCUMENTS

| JP | 08-146528 | 6/1996 |
| JP | 2000-078367 | 3/2000 |
| JP | 2002-218177 | 8/2002 |
| JP | 2004-252268 | 9/2004 |
| JP | 2005-091691 | 4/2005 |

* cited by examiner

*Primary Examiner*—Cheukfan Lee
(74) *Attorney, Agent, or Firm*—Harness, Dickey & Pierce, P.L.C.

(57) ABSTRACT

An image scanner includes first and second carriages, a body, a power source, a power supplier, and a tensioner. In the first carriage moving at a predetermined speed, a light source emits light onto an original. A first mirror deflects the light reflected by the original. In the second carriage moving at a half speed of the first carriage, second and third mirrors deflect the light deflected by the first and second mirrors, respectively. The body holds the first and second carriages. The power source drives the light source. The power supplier is connected to the power source and the light source to supply power from the power source to the light source. The tensioner provided on the second carriage contacts the power supplier at a position outside an optical light path and applies tension to the power supplier.

18 Claims, 11 Drawing Sheets

FIG. 9
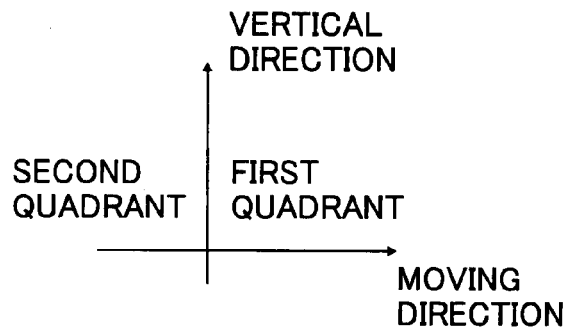
FIG. 10
| t (mm) | TENSION (g) |
|---|---|
| 0.100 | 11.3 |
| 0.125 | 12.0 |
| 0.188 | 16.0 |
| 0.200 | 18.0 |
| 0.250 | 35.0 |
FIG. 11
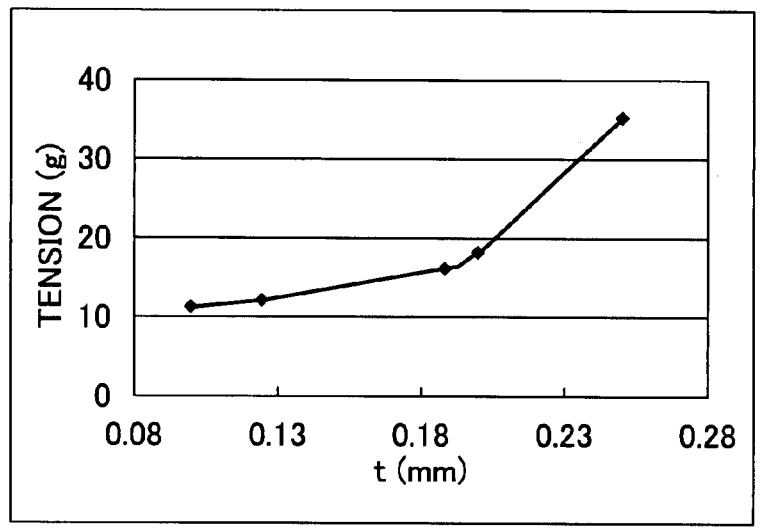

| | R/t | | | |
|---|---|---|---|---|
| | 130 | 140 | 150 | 160 |
| RUBS | YES | ALMOST NONE | NONE | NONE |
| DURABILITY | POOR | NOT GOOD | GOOD | GOOD |

IMAGE SCANNER, IMAGE FORMING APPARATUS, AND IMAGE SCANNING METHOD

PRIORITY STATEMENT

The present patent application claims priority from Japanese Patent Application No. 2006-309701, filed on Nov. 15, 2006 in the Japan Patent Office, the entire contents of which are hereby incorporated herein by reference.

BACKGROUND OF THE INVENTION

1. Field of the Invention

Example embodiments generally relate to an image scanner, an image forming apparatus, and/or an image scanning method, for example for scanning an image.

2. Description of the Related Art

A related-art image forming apparatus, such as a copying machine, a facsimile machine, a printer, or a multifunction printer having two or more of copying, printing, scanning, and facsimile functions, forms an image on a recording medium (e.g., a sheet) according to image data.

The image forming apparatus generally includes an image scanner for scanning an image on an original to create image data. For example, in the image scanner, a lamp emits light onto an original bearing an image. The light reflected by the original enters a light receiver including a photoelectric conversion device (e.g., a charge-coupled device).

FIGS. 1 and 2 illustrate an example related-art image scanner 100R. In the image scanner 100R, lamps 11R are mounted on a first carriage 10R. The first carriage 10R moves in a main scanning direction. While the lamps 11R mounted on the first carriage 10R move, the lamps 11R emit light onto an original placed on an exposure glass. The lamps 11R may emit light onto a large size original. Therefore, the first carriage 10R moves from a position corresponding to an end of the exposure glass to a position corresponding to another end of the exposure glass in the main scanning direction.

A first mirror 13R, a second mirror 21R, and a third mirror 22R deflect light reflected by the original toward a light receiver (not shown). The first mirror 13R is mounted on the first carriage 10R. The second mirror 21R and the third mirror 22R are mounted on a second carriage 20R. The second carriage 20R moves with the first carriage 10R at a half speed of the first carriage 10R, so as to maintain a constant optical light path length originating from the original and terminating at the light receiver even when the lamps 11R emit light onto the original from various positions. Thus, the first mirror 13R deflects light reflected by the original toward the second mirror 21R. The second mirror 21R deflects the light toward the third mirror 22R. The third mirror 22R deflects the light toward the light receiver.

A power source 120R for driving the lamps 11R is connected to the lamps 11R via a flexible circuit board 110R serving as a power supplier. The flexible circuit board 110R has flexibility to cause the first carriage 10R to move smoothly. The flexible circuit board 110R extends from the power source 120R to the lamps 11. For example, the flexible circuit board 110R runs on a bottom of a body 101R, passes the second carriage 20R, and reaches the lamps 11R. The second carriage 20R turns the flexible circuit board 110R toward the first carriage 10R.

The flexible circuit board 110R may sag due to its weight. When the first carriage 10R is far removed from the second carriage 20R, the flexible circuit board 110R may sag substantially, and may block an optical light path P formed between the first mirror 13R and the second mirror 21R, resulting in formation of a faulty image. For example, when the first carriage 10R is near the second carriage 20R, the flexible circuit board 110R may not sag substantially, as illustrated in FIG. 1. However, when the first carriage 10R is far removed from the second carriage 20R in order to scan a large size original, the flexible circuit board 110R may sag substantially and may block the optical light path P, as illustrated for example in FIG. 2.

To address this problem, another example of a related-art image scanner includes an elastic portion for applying tension to the flexible circuit board 10R. The elastic portion increases tension on the flexible circuit board 110R as a distance between the first carriage 10R and the second carriage 20R increases. Resistance is applied to an edge of the flexible circuit board 110R in particular, and such locally applied resistance may degrade the durability of the flexible circuit board 110R, resulting in broken circuits and sharply reducing reliability.

SUMMARY

At least one embodiment may provide an image scanner that includes a first carriage, a second carriage, a body, a power source, a power supplier, and a tensioner. The first carriage moves at a predetermined speed, and includes a light source and a first mirror. The light source emits light onto an original. The first mirror deflects the light reflected by the original. The second carriage moves at a half speed of the first carriage, and includes a second mirror and a third mirror. The second mirror deflects the light deflected by the first mirror. The third mirror deflects the light deflected by the second mirror. The body movably holds the first carriage and the second carriage. The power source is attached to the body and drives the light source. The power supplier has flexibility and is connected to the power source and the light source to supply power from the power source to the light source. The tensioner contacts the power supplier at a position outside an optical light path and applies tension to the power supplier. The tensioner is provided on the second carriage.

At least one embodiment may provide an image forming apparatus that includes an image scanner for scanning an image on an original. The image scanner includes a first carriage, a second carriage, a body, a power source, a power supplier, and a tensioner. The first carriage moves at a predetermined speed, and includes a light source and a first mirror. The light source emits light onto an original. The first mirror deflects the light reflected by the original. The second carriage moves at a half speed of the first carriage, and includes a second mirror and a third mirror. The second mirror deflects the light deflected by the first mirror. The third mirror deflects the light deflected by the second mirror. The body movably holds the first carriage and the second carriage. The power source is attached to the body and drives the light source. The power supplier has flexibility and is connected to the power source and the light source to supply power from the power source to the light source. The tensioner contacts the power supplier at a position outside an optical light path and applies tension to the power supplier. The tensioner is provided on the second carriage.

At least one embodiment may provide an image scanning method that includes moving a first carriage at a predetermined speed, emitting light from a light source provided on the first carriage onto an original, and deflecting the light reflected by the original with a first mirror provided on the first carriage. The method further includes moving a second carriage at a half speed of the first carriage, deflecting the light deflected by the first mirror with a second mirror provided on the second carriage, and deflecting the light deflected by the second mirror with a third mirror provided on the second carriage. The method further includes movably holding the first carriage and the second carriage with a body, driving the light source with a power source attached to the body, and connecting the power source to the light source via a power supplier for supplying power from the power source to the light source. The method further includes causing a tensioner provided on the second carriage to contact the power supplier at a position outside an optical light path, and applying tension to the power supplier with the tensioner.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein:

FIG. 9 illustrates a coordination system for explaining a direction of a tension applied by the tensioner shown in FIG. 8;

FIG. 10 is a look-up table illustrating a thickness of the tensioner shown in FIG. 8 and a tension applied by the tensioner;

FIG. 11 is a graph illustrating a relationship between the thickness of the tensioner and the tension applied by the tensioner shown in FIG. 10;

Figure 1:
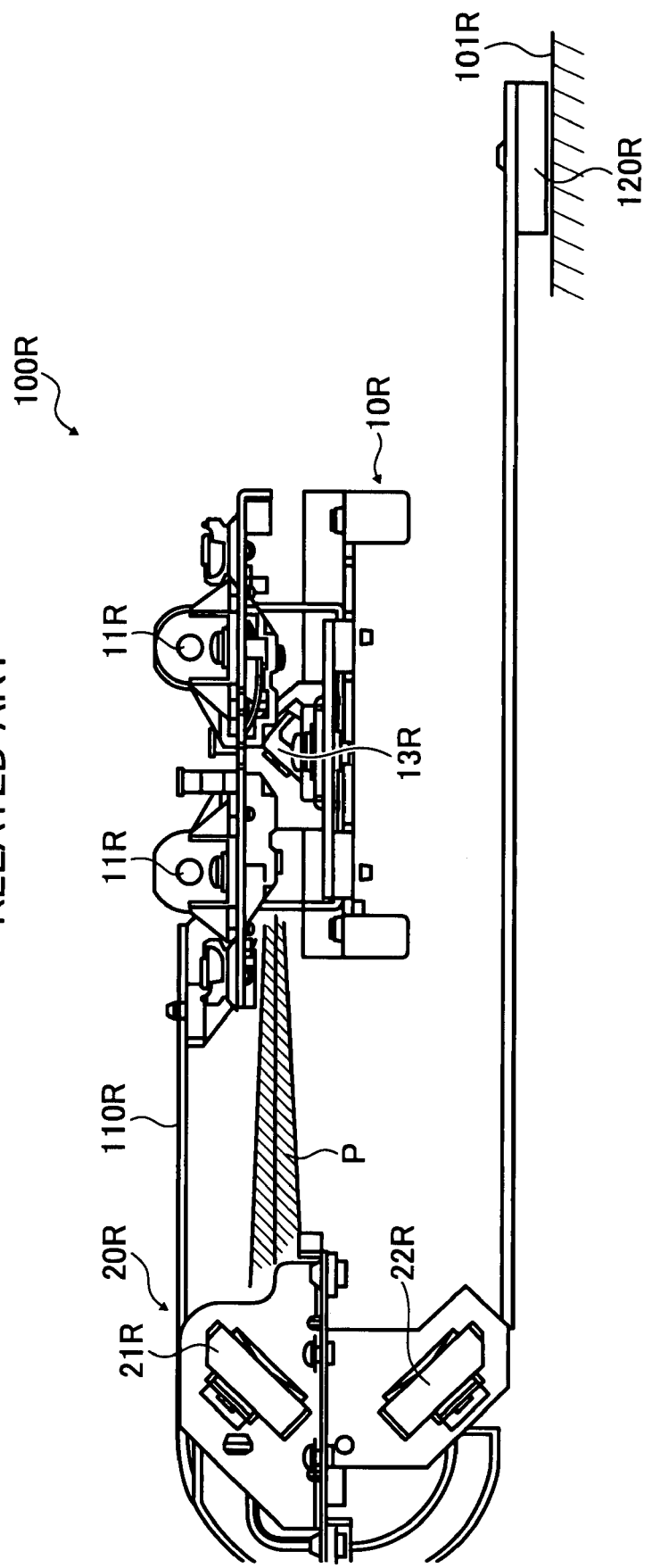
FIG. 1 is a sectional view of a related-art image scanner.
Figure 2:
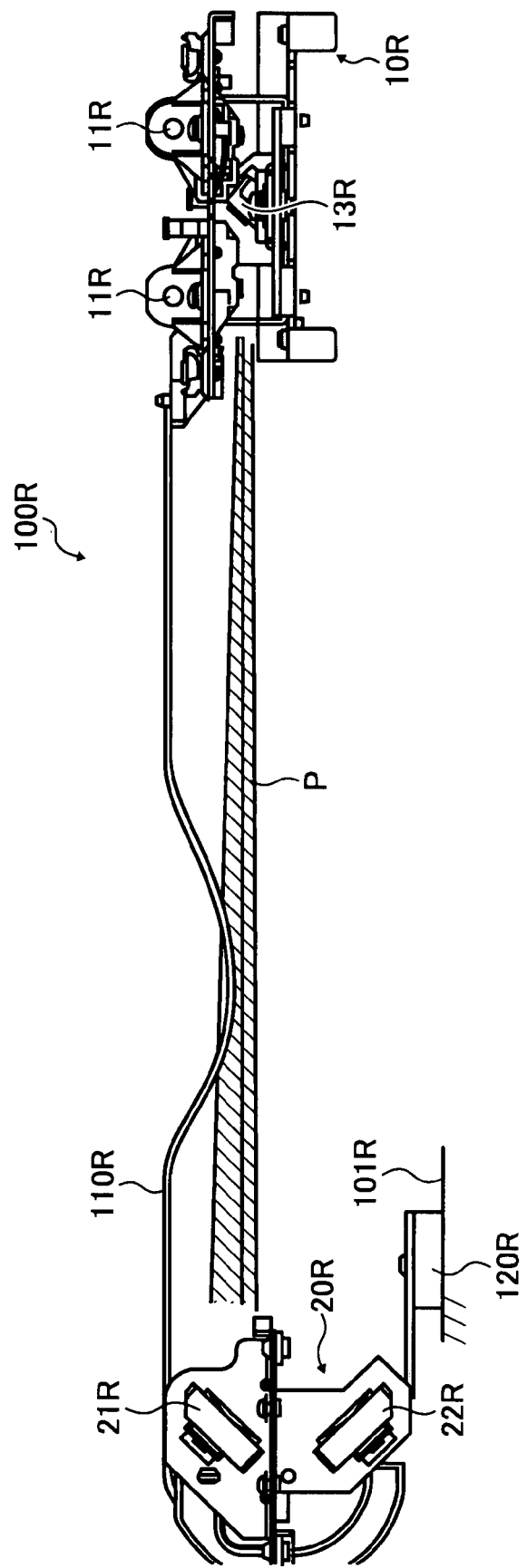
FIG. 2 is another sectional view of the related-art image scanner shown in FIG. 1.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 3:
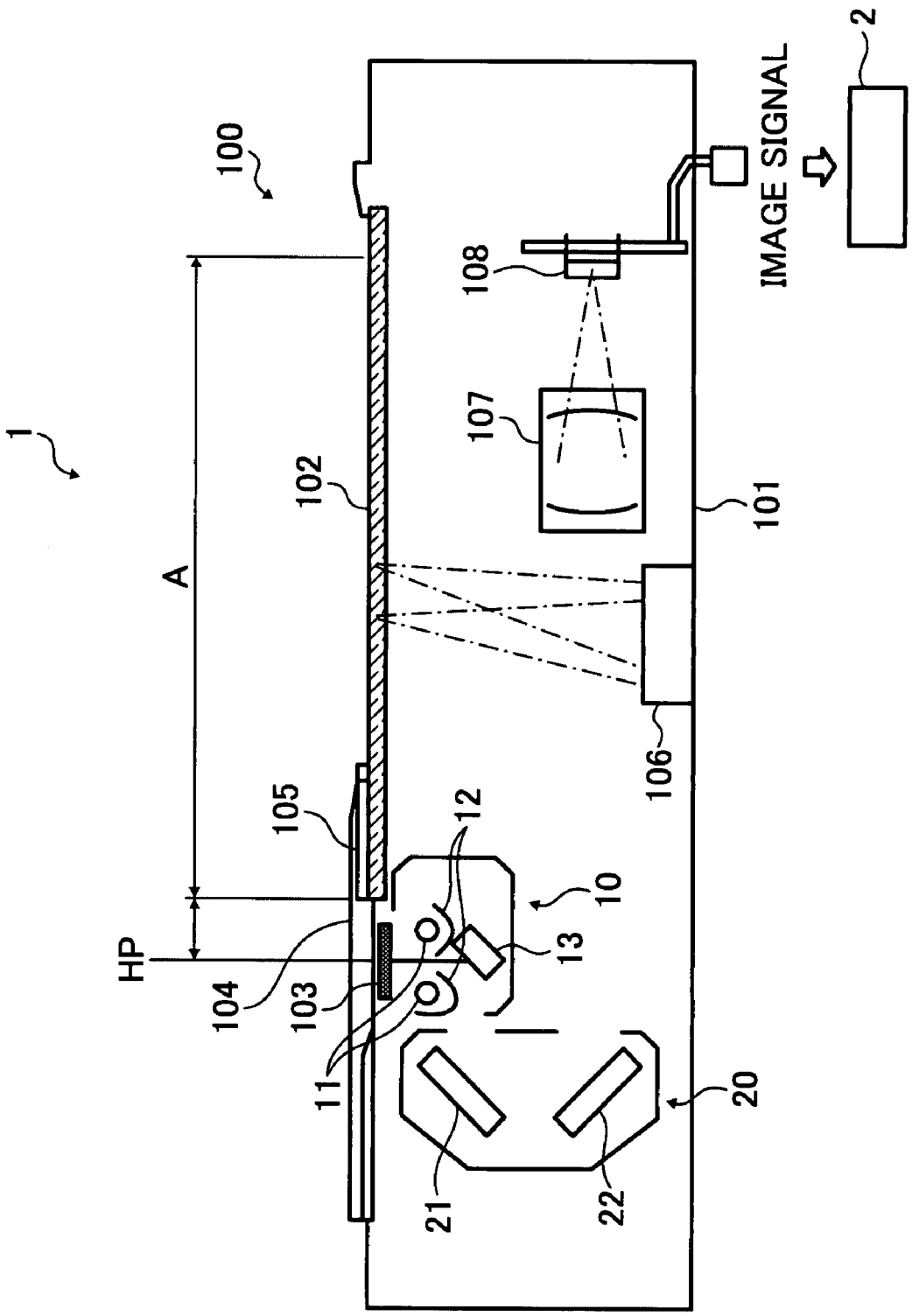
FIG. 3 is a sectional view of an image forming apparatus according to an example embodiment.

Referring now to the drawings, wherein like reference numerals designate identical or corresponding parts throughout the several views, particularly to FIG. 3, an image forming apparatus 1 according to an example embodiment is explained.

FIG. 3 is a sectional view of the image forming apparatus 1. As illustrated in FIG. 3, the image forming apparatus 1 includes an image scanner 100 and/or an image signal processor 2. The image scanner 100 includes a body 101 and/or an exposure glass 102. The body 101 includes a first carriage 10, a second carriage 20, a thermistor 103, an original scale 104, a white reference plate 105, an original sensor 106, a lens 107, and/or a CCD (charge-coupled device) line sensor 108. The first carriage 10 includes lamps 11, reflectors 12, and/or a first mirror 13. The second carriage 20 includes a second mirror 21 and/or a third mirror 22.

The image forming apparatus 1 may be a copying machine, a facsimile machine, a printer, a multifunction printer having two or more of copying, printing, scanning, and facsimile functions, or the like. The image scanner 100 scans an image on an original to generate an image signal, and sends the image signal to the image signal processor 2. The image signal processor 2 processes the image signal.

The exposure glass 102 is disposed on the body 101. An original bearing an image is placed on the exposure glass 102. The body 101 movably holds the first carriage 10 and the second carriage 20. The first carriage 10 moves in a scan area A. The second carriage 20 moves in a direction, in which the first carriage 10 moves, in synchronism with the first carriage 10 at about a half speed of the first carriage 10 to maintain a constant optical light path length. The lamps 11, the reflectors 12, and the first mirror 13 are mounted on the first carriage 10. The second mirror 21 and the third mirror 22 are mounted on the second carriage 20.

The thermistor 103 is disposed adjacent to the exposure glass 102, and detects a temperature of the body 101. The original scale 104 aligns an original placed on the exposure glass 102. The white reference plate 105 is used for color configuration. The original sensor 106 detects whether or not an original is placed on the exposure glass 102 and the size of the original. The lens 107 forms an image in the CCD line sensor 108 based on an image on the original placed on the exposure glass 102. The CCD line sensor 108 includes a photoelectric conversion element.

Figure 4:
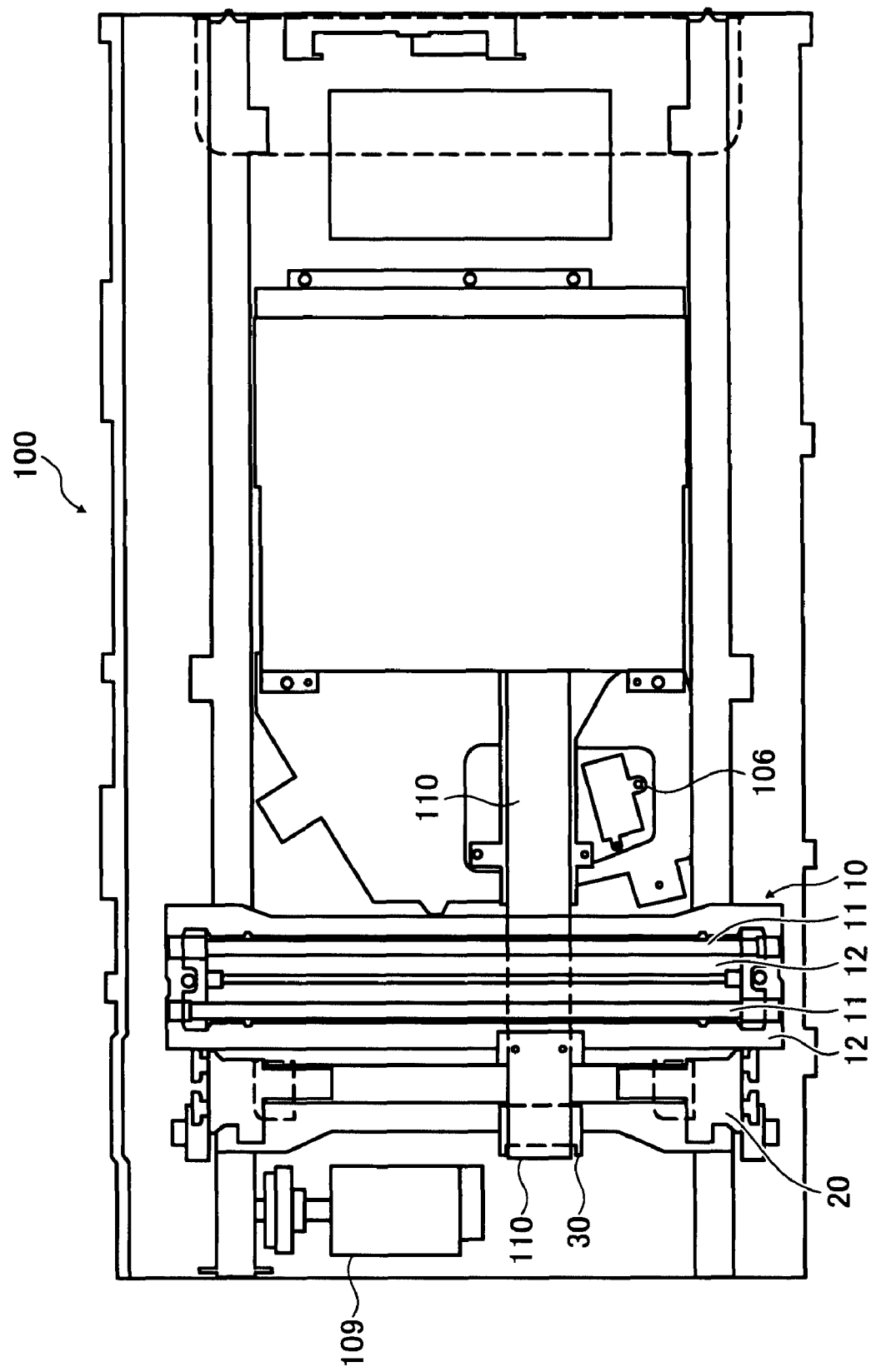
FIG. 4 is a plane view (according to an example embodiment) of an image scanner of the image forming apparatus shown in FIG. 3.
Figure 5:
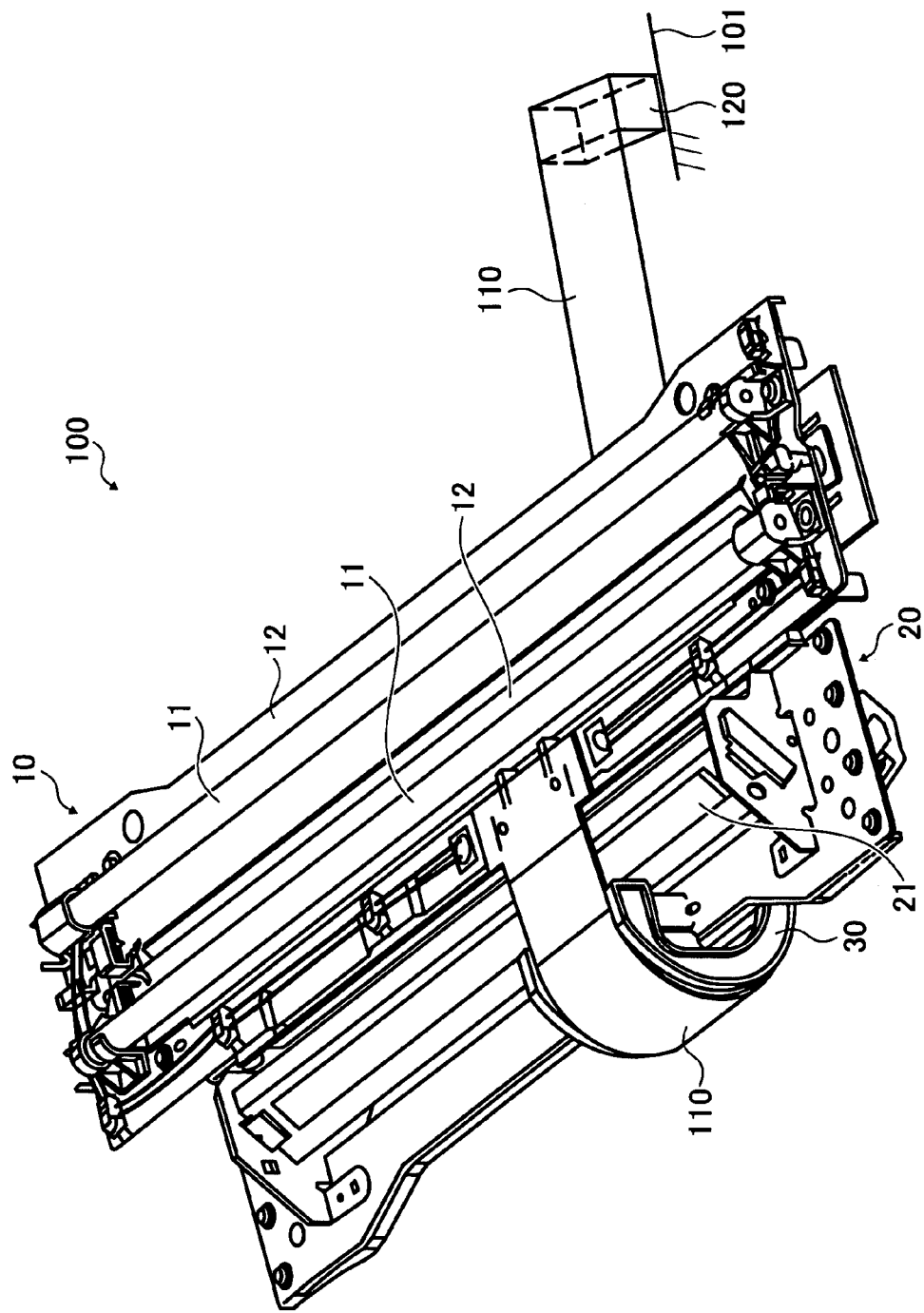
FIG. 5 is a perspective view (according to an example embodiment) of the image scanner shown in FIG. 4.

FIG. 4 is a plane view of the image scanner 100. FIG. 5 is a perspective view of the image scanner 100. As illustrated in FIG. 4, the image scanner 100 further includes a carriage driving motor 109, a flexible circuit board 110, and/or a guide 30. As illustrated in FIG. 5, the image scanner 100 further includes a power source 120.

As illustrated in FIG. 5, the carriage driving motor 109 (depicted in FIG. 4) is provided in the body 101, and drives the first carriage 10 and the second carriage 20. The power source 120 (e.g., an output portion of a power source circuit) is attached to the body 101 and drives the lamps 11 serving as a light source. The flexible circuit board 110, serving as a power supplier, connects the lamps 11 to the power source 120, and supplies power from the power source 120 to the lamps 11. The flexible circuit board 110 has flexibility to cause the first carriage 10 to move smoothly. The flexible circuit board 110 extends from the power source 120 to the lamps 11. For example, the flexible circuit board 110 runs on a bottom of the body 101, passes the second carriage 20, and reaches the lamps 11 mounted on the first carriage 10 moving to scan an image on an original. The guide 30, serving as a support member for curving and supporting the flexible circuit board 110, is attached to the second carriage 20. The guide 30 has an arc-like shape for turning and curving the flexible circuit board 110. Thus, the guide 30 guides the flexible circuit board 110 toward the first carriage 10.

As illustrated in FIG. 4, the guide 30 and the flexible circuit board 110 are disposed at a position between the carriage driving motor 109 and the original sensor 106.

As illustrated in FIG. 3, in the above-described structure, the lamps 11 emit light onto an original placed on the exposure glass 102. The original reflects the light toward the first mirror 13. The first mirror 13 deflects the light toward the second mirror 21. The second mirror 21 further deflects the light toward the third mirror 22. The third mirror 22 further deflects the light toward the lens 107. The light passes the lens 107 and enters the CCD line sensor 108. The CCD line sensor 108 converts the light into an electric signal (e.g., an image signal). The image signal is sent to the image signal processor 2. The image forming apparatus 1 performs an image forming operation according to the image signal processed by the image signal processor 2. For example, the image forming apparatus 1 forms an image in a predetermined mode (e.g., a full color mode or a monochrome mode).

As illustrated in FIG. 5, two lamps 11 and two reflectors 12 are mounted on the first carriage 10. One end of the flexible circuit board 110 is connected to the first carriage 10 via a connector. The flexible circuit board 110 connected to the first carriage 10 supplies power to the two lamps 11.

The guide 30 is attached to the second carriage 20. The guide 30 has a curved shape having a predetermined radius to curve the flexible circuit board 110. Another end of the flexible circuit board 110 is fixed to the power source 120 attached to the body 101.

Figure 6:
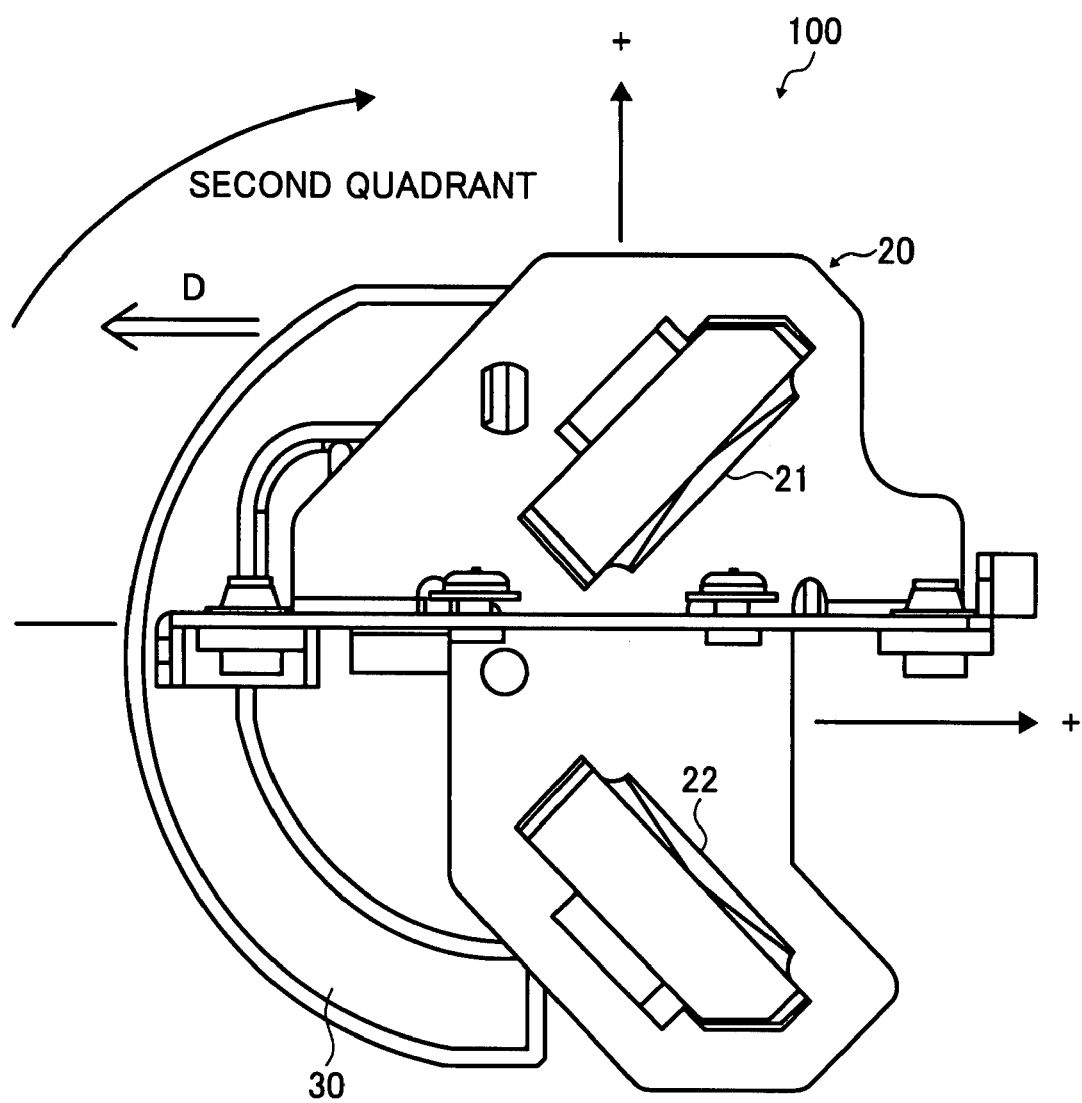
FIG. 6 is an enlarged front view (according to an example embodiment) of the image scanner shown in FIG. 5.

FIG. 6 is an enlarged front view of the guide 30. As illustrated in FIG. 6, the guide 30 is attached to the second carriage 20. For example, the guide 30 faces a back side of the second mirror 21 and the third mirror 22 on the second carriage 20.

Figure 7:
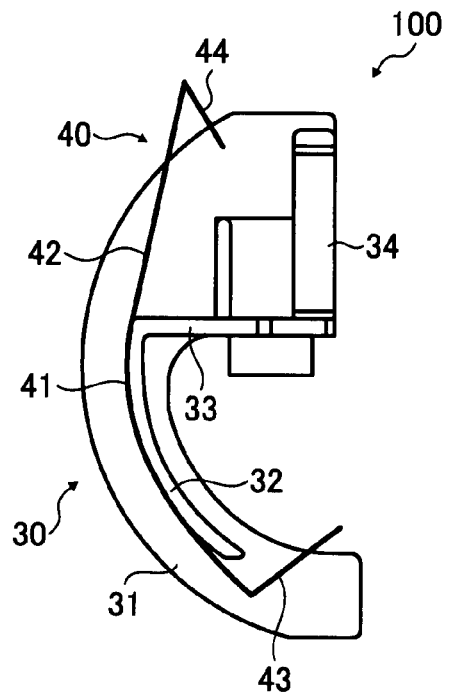
FIG. 7 is a sectional view (according to an example embodiment) of a support member and a tensioner of the image scanner shown in FIG. 5.

As illustrated in FIG. 7, the image scanner 100 further includes a tensioner 40. The guide 30 includes a guide pair 31, a curve portion 32, and/or stages 33 and 34. The tensioner 40 includes a lower bend portion 43, an upper bend portion 44, an adhering portion 41, and/or an elastic portion 42.

Figure 8:
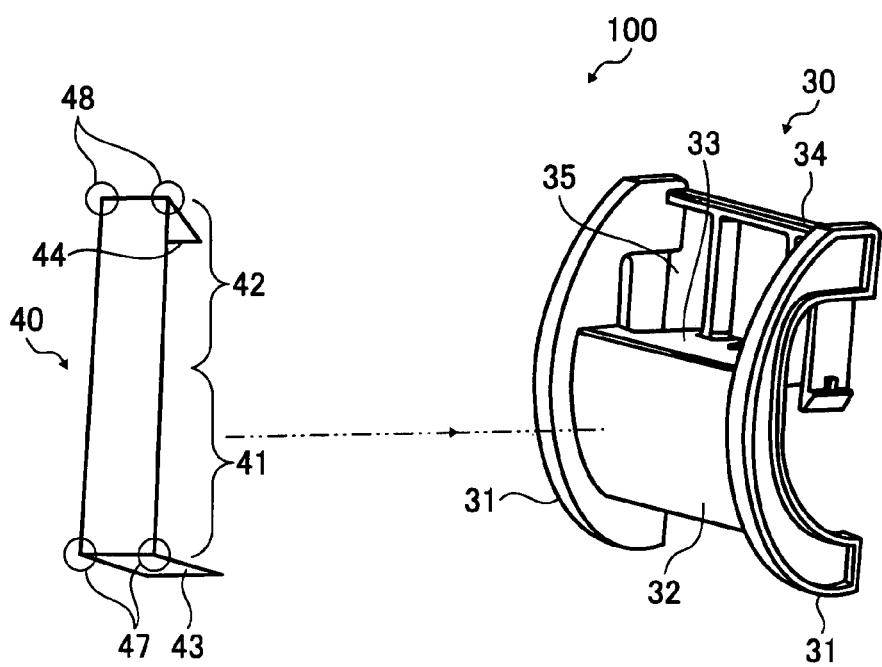
FIG. 8 is a perspective view (according to an example embodiment) of the support member and the tensioner shown in FIG. 7.

As illustrated in FIG. 8, the guide 30 further includes a space 35. The tensioner 40 further includes corners 47 and 48.

As illustrated in FIG. 7, the tensioner 40 is attached to the guide 30 provided on the second carriage 20 (depicted in FIG. 6). For example, the tensioner 40 pushes or applies tension to the flexible circuit board 110 (depicted in FIG. 5) in a direction D illustrated in FIG. 6 in a second quadrant on a coordinate system in which a moving direction of the second carriage 20 and an upward, vertical direction are indicated as positive directions.

As illustrated in FIG. 8, in the guide 30, the guide pair 31 has an arc-like shape. Two plates of the guide pair 31 sandwich the curve portion 32 having an arc-like shape. The stages 33 and 34 are provided in and above a middle portion of the guide 30 in a vertical direction to form the space 35. The tensioner 40 includes a PET (polyethylene terephthalate) thin plate. Both ends of the tensioner 40 are bent to form the lower bend portion 43 and the upper bend portion 44. The lower bend portion 43 and the upper bend portion 44 prevent edge portions (e.g., the both ends) of the tensioner 40 from damaging the flexible circuit board 110 (depicted in FIG. 5), and cause the tensioner 40 to guide the flexible circuit board 110 smoothly. The adhering portion 41 and the elastic portion 42 are provided between the lower bend portion 43 and the upper bend portion 44. The elastic portion 42 has elasticity and has a thin plate shape (e.g., a planar shape). The adhering portion 41, serving as an attaching portion, is integrated with the elastic portion 42.

The tensioner 40 is adhered to the guide 30 with double-faced tape. For example, the adhering portion 41, serving as an attaching portion, of the tensioner 40 is adhered to the curve portion 32 of the guide 30. Since the tensioner 40 is attached (e.g., fixed) to the curve portion 32 at the adhering portion 41, an adhesion area, in which the adhering portion 41 is adhered to the curve portion 32 with double-faced tape, may be as large as possible.

The tensioner 40 applies a force (e.g., a tension) in a direction in the second quadrant, which is negative with respect to the moving direction of the second carriage 20 (depicted in FIG. 6) and positive with respect to the vertical direction, as illustrated in FIG. 9. Therefore, the tensioner 40 may stably maintain a curved shape even when the second carriage 20 moves.

The tensioner 40 is cut from a PET (polyethylene terephthalate) sheet roll in a manner that the tensioner 40 may easily curl in a direction opposite to the direction in which the flexible circuit board 110 is curved. Thus, the tensioner 40 may properly apply a force to the flexible circuit board 110.

The corners 47 and 48 are provided on an outer circumferential surface of the tensioner 40, and contact the flexible circuit board 110. The corners 47 and 48 are rounded to have a smooth surface. If the tensioner 40 has sharp corners, for example, the sharp corners of the tensioner 40 may contact and rub the flexible circuit board 110 while the first carriage 10 and the second carriage 20 (depicted in FIG. 5) move. As a result, the flexible circuit board 110 may be damaged. When the tensioner 40 repeatedly rubs the flexible circuit board 110, the flexible circuit board 110 may be broken.

A thickness of a PET sheet forming the tensioner 40 may affect elasticity of the tensioner 40. The radius of the curve of the guide 30, which curves the flexible circuit board 110, may affect durability of the tensioner 40 which is repeatedly curved. Generally, the tensioner 40 may preferably apply tension of about 20 g or smaller to the flexible circuit board 110. When the tensioner 40 applies tension greater than about 20 g, a surface of the flexible circuit board 110 may be rubbed with time.

FIG. 10 is a look-up table illustrating the thickness of the tensioner 40 (depicted in FIG. 7) and the tension applied by the tensioner 40 to the flexible circuit board 110 (depicted in FIG. 5). FIG. 11 is a graph illustrating a relationship between the thickness of the tensioner 40 and the tension applied by the tensioner 40 to the flexible circuit board 110. As illustrated in FIGS. 10 and 11, when the PET sheet forming the tensioner 40 has a thickness t of about 0.2 mm or smaller, the tensioner 40 may apply tension of about 20 g or smaller to the flexible circuit board 110. According to this non-limiting example embodiment, the PET sheet forming the tensioner 40 has a thickness t of about 0.188 mm, so that the tensioner 40 applies tension of about 16 g to the flexible circuit board 110.

When the guide 30 (depicted in FIG. 7) forms a curve having a radius R, a relationship R/t between the radius R of the guide 30 and the thickness t of the tensioner 40 is indicated as R/t≧150. According to this non-limiting example embodiment, the radius R of the guide 30 and the thickness t of the tensioner 40 have the relationship R/t indicated as R/t=151.6. Therefore, the guide 30 has a radius R of about 28.5 mm.

Figures 12, 13:
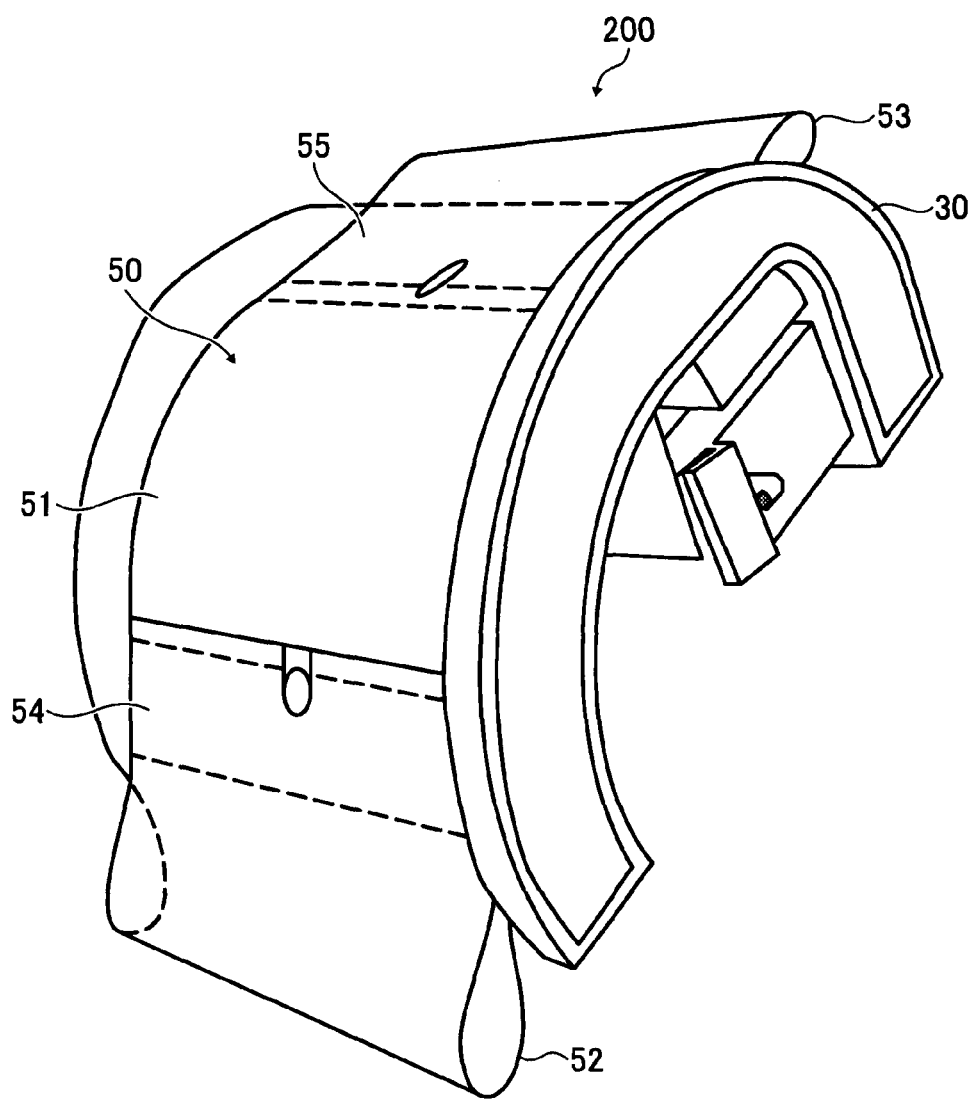
FIG. 12 is a look-up table illustrating results of a durability test of a power supplier of the image scanner shown in FIG. 5.
FIG. 13 is a perspective view of an image scanner according to another example embodiment.

FIG. 12 is a look-up table illustrating results of a durability test of the flexible circuit board 110 (depicted in FIG. 5). In the durability test, rubs of the surface of the flexible circuit board 110 at a position at which the flexible circuit board 110 slides on the guide 30 (depicted in FIG. 5), and durability of the flexible circuit board 110 were checked in an environment in which the image scanner 100 (depicted in FIG. 5) was used. In the durability test, the relationship R/t between the radius R of the guide 30 and the thickness t of the tensioner 40 (depicted in FIG. 7) varied from about 130 to about 160. As illustrated in FIG. 12, when the relationship R/t is not smaller than 150 (e.g., R/t≧150), the flexible circuit board 110 may provide a proper durability and a proper resistance against rubs by the tensioner 40.

Referring to FIG. 13, the following describes an image scanner 200 according to another example embodiment. FIG. 13 is a perspective view of a support member and a tensioner included in the image scanner 200. As illustrated in FIG. 13, the image scanner 200 includes the guide 30 and/or a tensioner 50. The tensioner 50 includes a body 51, loops 52 and 53, and/or adhering portions 54 and 55. The other elements of the image scanner 200 are common to the image scanner 100 (depicted in FIG. 3).

The guide 30 serves as a support member for curving and supporting the flexible circuit board 110 (depicted in FIG. 5). The tensioner 50, which is attached to the guide 30, has a shape different from the shape of the tensioner 40 (depicted in FIG. 8). For example, both ends of the tensioner 50 are folded back or rolled to form creaseless loops 52 and 53. The loops 52 and 53 are adhered to the body 51 at the adhering portions 54 and 55, respectively, with double-faced tape. The tensioner 50 is attached to the guide 30, like the tensioner 40. Thus, the both ends of the tensioner 50 may not damage the flexible circuit board 110.

Figure 14:
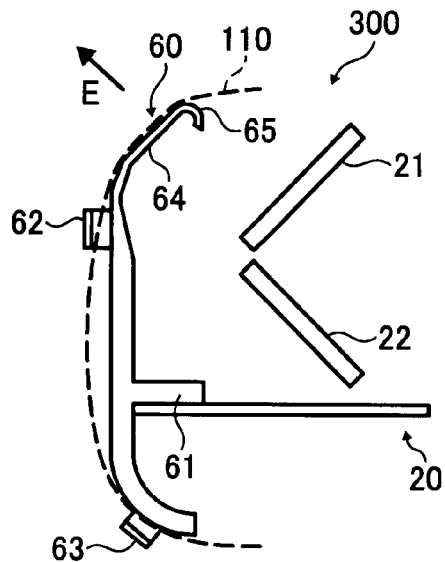
FIG. 14 is a sectional view of an image scanner according to yet another example embodiment.

Referring to FIG. 14, the following describes an image scanner 300 according to yet another example embodiment. FIG. 14 is a sectional view of a support member and a tensioner included in the image scanner 300. As illustrated in FIG. 14, the image scanner 300 includes a guide 60. The guide 60 includes an attaching portion 61, a guide surface 62, an engaging portion 63, a tensioner 64, and/or a curve portion 65. The other elements of the image scanner 300 are common to the image scanner 100 (depicted in FIG. 3).

The guide 60 serves as a support member for curving and supporting the flexible circuit board 110, and is attached to the second carriage 20. The guide 60 includes a tensioner. Namely, the tensioner is integrated with the guide 60. The attaching portion 61 of the guide 60 is attached to the second carriage 20. The guide surface 62 contacts and curves the flexible circuit board 110. The engaging portion 63 engages with the flexible circuit board 110 so that the flexible circuit board 110 does not separate from the guide surface 62. The tensioner 64 is provided adjacent to the guide surface 62. The tensioner 64, serving as an elastic portion having elasticity, applies tension to the flexible circuit board 110 in a direction E (e.g., the second quadrant depicted in FIG. 9). The tensioner 64 may have a thin plate shape (e.g., a planar shape) and may include a resin.

The tensioner 64 has a thickness smaller than the thickness of the guide surface 62. The curve portion 65 is provided on a head of the tensioner 64 to prevent an edge portion of the tensioner 64 from contacting the flexible circuit board 110 and thereby damaging the flexible circuit board 110. Namely, the tensioner 64 covers an edge of the guide 60 guiding the curved flexible circuit board 110. The flexible circuit board 110 constantly contacts the tensioner 64.

According to this non-limiting example embodiment, the tensioner 64 may apply constant tension to a flexible conductive member (e.g., the flexible circuit board 110) for driving a light source. A constant load may be applied to the flexible conductive member both when the image scanner 300 performs a scanning operation and when the image scanner 300 stops. A load is not locally applied to the flexible circuit board 110, resulting in an increased durability of the flexible circuit board 110.

Figure 15:
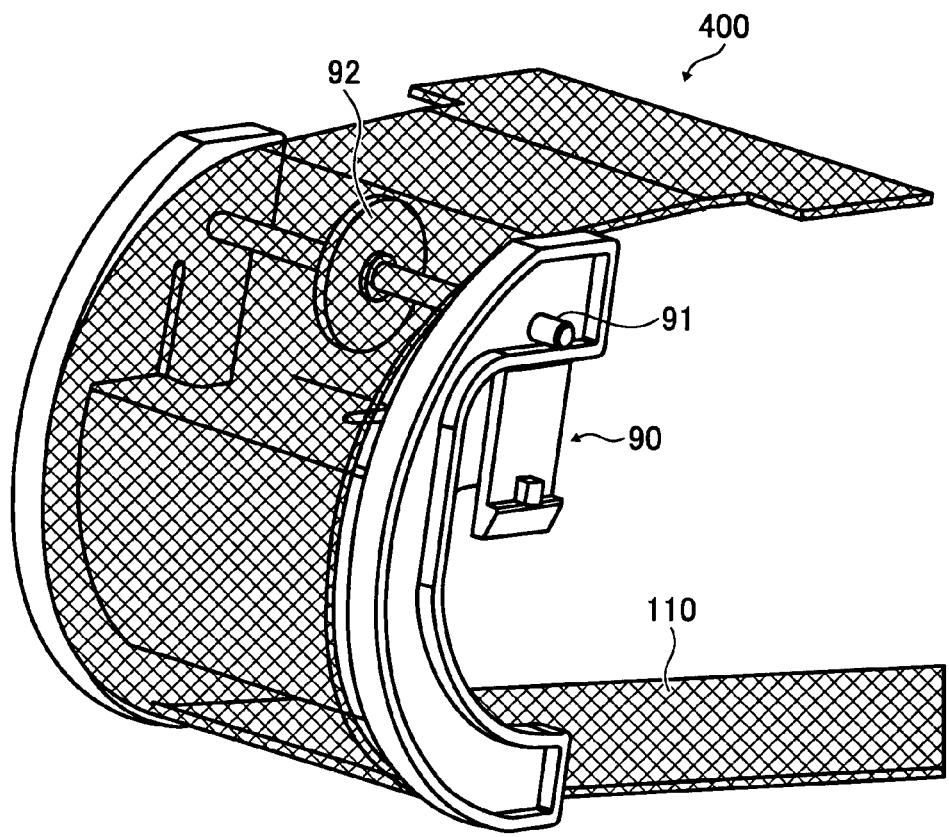
FIG. 15 is a perspective view of an image scanner according to yet another example embodiment.
Figure 16:
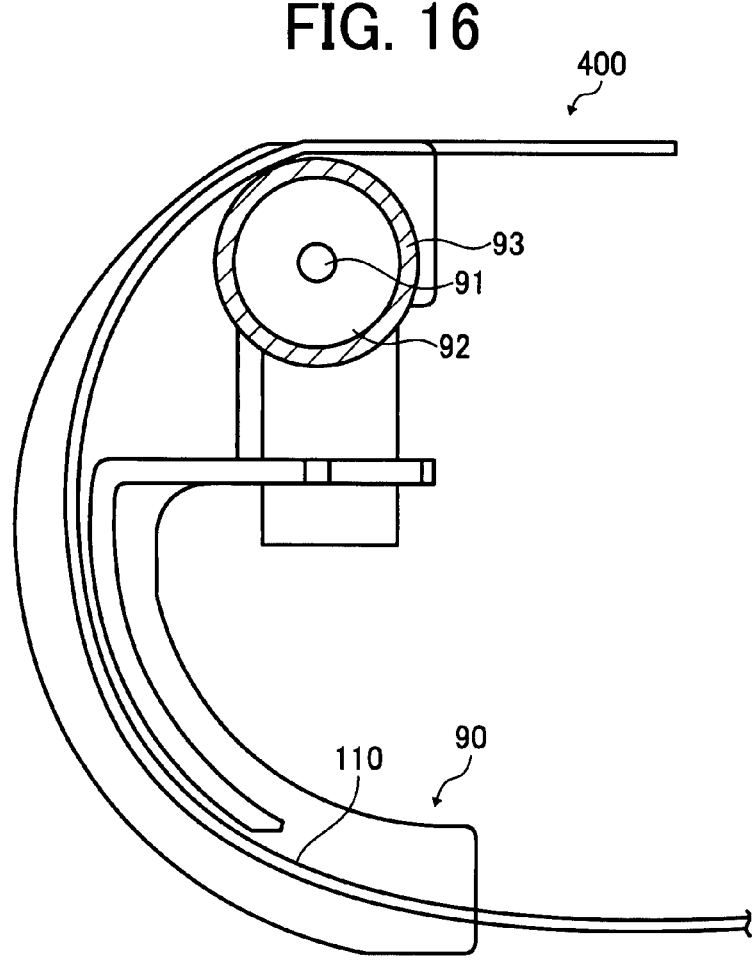
FIG. 16 is a sectional view (according to an example embodiment) of the image scanner shown in FIG. 15.
Figure 17:
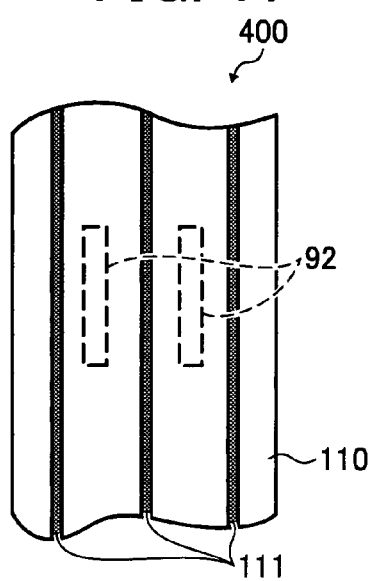
FIG. 17 is a plane view (according to an example embodiment) of a power supplier of the image scanner shown in FIG. 15.

Referring to FIGS. 15 to 17, the following describes an image scanner 400 according to yet another example embodiment. FIG. 15 is a perspective view of a support member included in the image scanner 400. FIG. 16 is a sectional view of the support member included in the image scanner 400. As illustrated in FIG. 15, the image scanner 400 includes a guide 90. The guide 90 includes a shaft 91 and/or a pulley 92. As illustrated in FIG. 16, the guide 90 further includes an elastic portion 93. As illustrated in FIG. 17, the flexible circuit board 110 includes a circuit pattern 111. The other elements of the image scanner 400 are common to the image scanner 100 (depicted in FIG. 3).

As illustrated in FIG. 15, the guide 90 serves as a support member for curving and supporting the flexible circuit board 110. The guide 90 has the shape common to the guide 30 included in the image scanner 100 (depicted in FIG. 8). The pulley 92 is attached to the shaft 91. The pulley 92 is disposed at a position at which the pulley 92 does not touch the circuit pattern 111 (depicted in FIG. 17) of the flexible circuit board 110. The pulley 92 may rotate about the shaft 91.

As illustrated in FIG. 16, the elastic portion 93 is disposed on an outer circumferential surface of the pulley 92. The elastic portion 93 has a low friction coefficient and serves as a slide member. The elastic portion 93 may include an elastic body (e.g., sponge, felt, and/or the like) and/or sponge or felt to which a lubricant is adhered.

The pulley 92 constantly contacts the flexible circuit board 110, and rotates in accordance with the movement of the flexible circuit board 110.

According to this non-limiting example embodiment, when the flexible circuit board 110 moves, the pulley 92 of the guide 90 contacts the flexible circuit board 110 with a decreased friction coefficient. The pulley 92 rotates in accordance with the movement of the flexible circuit board 110. Thus, the pulley 92 may apply tension to the flexible circuit board 110 without rubbing and thereby damaging the flexible circuit board 110.

According to this non-limiting example embodiment, the pulley 92 prevents the flexible circuit board 110 from rubbing the guide 90. The flexible circuit board 110 may contact the pulley 92 of the guide 90 at a decreased area, resulting in an improved durability of the flexible circuit board 110. The elastic portion 93 having a low friction coefficient may be attached to the pulley 92, further improving the durability of the flexible circuit board 110. For example, even when the flexible circuit board 110 includes a thin, soft material such as polyimide, the flexible circuit board 110 may maintain durability. The elastic portion 93 serving as a slide member includes an elastic body, such as sponge and felt, and/or an elastic body to which a lubricant is adhered. Thus, the flexible circuit board 110 may provide an improved durability against rubs of a surface of the flexible circuit board 110 by the elastic portion 93.

According to this non-limiting example embodiment, the guide 90 includes a single pulley 92. However, the guide 90 may include a plurality of pulleys 92. FIG. 17 is a plane view of the flexible circuit board 110 to which a plurality of pulleys 92 contact. For example, two pulleys 92 are disposed at a position at which the pulleys 92 do not contact the circuit pattern 111 of the flexible circuit board 110. When the plurality of pulleys 92 are provided, the plurality of pulleys 92 contact the flexible circuit board 110 at an increased area, preventing repeated slides of the pulleys 92 from damaging the flexible circuit board 110.

According to the above-described example embodiments, a tensioner (e.g., the tensioner 40, 50, or 64 depicted in FIG. 8, 13, or 14, respectively) includes a thin plate having elasticity and the thin plate deforms to generate an elastic force for applying tension to, a power supplier (e.g., the flexible circuit board 110 depicted in FIG. 5). The tensioner includes a synthetic resin (e.g., the PET sheet). However, the tensioner may include a spring (e.g., a thin, metal plate including stainless steel and/or phosphor bronze).

According to the above-described example embodiments, in an image forming apparatus (e.g., the image forming apparatus 1 depicted in FIG. 3) or in an image scanner (e.g., the image scanner 100, 200, 300, or 400 depicted in FIG. 8, 13, 14, or 16, respectively), a power supplier (e.g., the flexible circuit board 110 depicted in FIG. 5) supplies power to a light source (e.g., the lamps 11 depicted in FIG. 5). Tension is applied to the power supplier without degrading durability of the power supplier in a manner that the power supplier does not block an optical light path in which light passes to scan an image on an original.

The present invention has been described above with reference to specific example embodiments. Nonetheless, the present invention is not limited to the details of example embodiments described above, but various modifications and improvements are, possible without departing from the spirit and scope of the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. An image scanner, comprising:
a first carriage to move at a predetermined speed, the first carriage including:
a light source to emit light onto an original; and
a first mirror to deflect the light reflected by the original;
a second carriage to move at a half speed of the first carriage, the second carriage including:
a second mirror to deflect the light deflected by the first mirror; and
a third mirror to deflect the light deflected by the second mirror;
a body to movably hold the first carriage and the second carriage;
a power source attached to the body to drive the light source;
a flexible power supplier connected to the power source and the light source to supply power from the power source to the light source; and
a tensioner provided on the second carriage to contact the flexible power supplier at a position outside an optical light path and apply tension to the flexible power supplier,
wherein the second carriage further includes a support member to curve and support the flexible power supplier, and
wherein the tensioner is disposed on the support member.

2. The image scanner according to claim 1,
wherein the tensioner comprises a thin elastic plate that deforms to generate an elastic force for applying tension to the flexible power supplier.

3. The image scanner according to claim 2,
wherein the thin elastic plate is formed of a synthetic resin including polyethylene terephthalate.

4. The image scanner according to claim 2,
wherein the thin elastic plate is formed of a metal including stainless steel and phosphor bronze.

5. The image scanner according to claim 2,
wherein an edge portion of the thin elastic plate does not contact the flexible power supplier.

6. The image scanner according to claim 1,
wherein the tensioner is formed of a resin and includes an attaching portion to attach the tensioner to the second carriage and a planar elastic portion, and
wherein the attaching portion is integrated with the planar elastic portion.

7. The image scanner according to claim 1,
wherein the tensioner applies tension to the flexible power supplier in an application direction on a coordinate system in which a moving direction of the second carriage and an upward, vertical direction are indicated as positive directions,
the application direction being negative with respect to the moving direction of the second carriage and positive with respect to the vertical direction.

8. The image scanner according to claim 1,
wherein the tensioner covers an edge of the support member guiding the curved flexible power supplier and the flexible power supplier constantly contacts the tensioner.

9. The image scanner according to claim 1,
wherein the support member forms a curve having a radius R and the tensioner has a thickness t, such that $R/t \geq 150$.

10. The image scanner according to claim 1,
wherein the support member faces a back side of the second mirror and the third mirror on the second carriage.

11. The image scanner according to claim 1, further comprising:
a carriage driving motor to drive the first carriage and the second carriage; and
an original sensor to detect the original,
wherein the carriage driving motor and the original sensor are provided in the body and the flexible power supplier is provided at a position between the carriage driving motor and the original sensor.

12. An image forming apparatus comprising the image scanner according to claim 1.

13. An image scanner, comprising:
a first carriage to move at a predetermined speed, the first carriage including:
a light source to emit light onto an original; and
a first mirror to deflect the light reflected by the original;
a second carriage to move at a half speed of the first carriage, the second carriage including:
a second mirror to deflect the light deflected by the first mirror; and
a third mirror to deflect the light deflected by the second mirror;
a body to movably hold the first carriage and the second carriage;
a power source attached to the body to drive the light source;
a flexible power supplier connected to the power source and the light source to supply power from the power source to the light source; and
a tensioner provided on the second carriage to contact the flexible power supplier at a position outside an optical light path and apply tension to the flexible power supplier,
wherein the second carriage further includes a support member to curve and support the flexible power supplier, and
wherein the support member includes a pulley disposed at a position at which the pulley does not contact any circuit pattern of the flexible power supplier.

14. The image scanner according to claim 13,
wherein the support member further comprises a slide member having a low friction coefficient disposed on an outer circumferential surface of the pulley.

15. The image scanner according to claim 14,
wherein the slide member comprises an elastic body including sponge and felt.

16. The image scanner according to claim 14,
wherein the slide member comprises a lubricated elastic body.

17. An image forming apparatus comprising the image scanner according to claim 13.

18. An image scanning method, comprising:
moving a first carriage at a predetermined speed;
emitting light from a light source provided on the first carriage onto an original;
deflecting the light reflected by the original with a first mirror provided on the first carriage;
moving a second carriage at a half speed of the first carriage;
deflecting the light deflected by the first mirror with a second mirror provided on the second carriage;
deflecting the light deflected by the second mirror with a third mirror provided on the second carriage;
movably holding the first carriage and the second carriage with a body;
driving the light source with a power source attached to the body;
connecting the power source to the light source via a flexible power supplier for supplying power from the power source to the light source;
causing a tensioner provided on the second carriage to contact the flexible power supplier at a position outside an optical light path; and
applying tension to the flexible power supplier with the tensioner,
wherein the second carriage further includes a support member to curve and support the flexible power supplier, and
wherein the tensioner is disposed on the support member.

* * * * *